United States Patent

[11] 3,604,883

| [72] | Inventor | Clifford H. Dietz<br>Indianapolis, Ind. |
|---|---|---|
| [21] | Appl. No. | 810,766 |
| [22] | Filed | Mar. 26, 1969 |
| [45] | Patented | Sept. 14, 1971 |
| [73] | Assignee | Engineered Models Corporation<br>Indianapolis, Ind. |

[54] MULTIPLE ELECTRODE ASSEMBLY FOR ELECTRICAL DISCHARGE MACHINING
2 Claims, 6 Drawing Figs.

| [52] | U.S. Cl. | 219/69,<br>314/133 |
|---|---|---|
| [51] | Int. Cl. | B23p 1/08,<br>H01t 13/28 |
| [50] | Field of Search | 219/69 E,<br>69 M, 69 V, 69 F, 315; 13/17; 314/133; 308/4 |

[56] References Cited
UNITED STATES PATENTS

| 1,430,927 | 10/1922 | Smalley | 219/315 |
|---|---|---|---|
| 2,154,737 | 4/1939 | Erdmann | 13/17 X |
| 3,098,148 | 7/1963 | Piot et al. | 219/69 E |

*Primary Examiner*—R. F. Staubly
*Attorney*—Woodard, Weikart, Emhardt & Naughton ABSTRACT: The invention is embodied in an assembly providing multiple, closely spaced electrodes for attachment to a conventional electrical discharge machining apparatus. The relatively slender (small-diameter) rod electrodes are each held in an encircling tube which is rigidly held in two spaced, parallel plates with a material such as an epoxy resin adhering to the plates and sealing the tubes in place.

INVENTOR
CLIFFORD H. DIETZ
BY
Woodard, Weikart, Emhardt & Naughton
Attorneys

MULTIPLE ELECTRODE ASSEMBLY FOR ELECTRICAL DISCHARGE MACHINING

BACKGROUND OF THE INVENTION

Electrical discharge machining apparatus is well known in the art and is disclosed in considerable detail in U.S. Pat. Nos. 2,981,822, 2,882,437 and 2,951,969 among others. Electrical discharge machining is based on creation of a series of intermittent electrical discharges across a gap in the presence of a dielectric coolant, usually circulating oil. The electrode which determines the shape or form of the hole or cavity being cut in a workpiece is positioned with respect to the workpiece and fed toward it during operation by means of an automatic feed mechanism such as that described in the aforementioned U.S. Pat. No. 2,882,437.

The process is particularly advantageous in the piercing or shaping of modern, heat-resistant, exotic metal alloys which resist ordinary machining. Such metals are utilized in the space vehicle program and, recently, in the somewhat more mundane field of manufacture of mineral fiber thermal insulation.

In such manufacture the mineral material is liquified at high temperature and, while in a flowing state, is extruded, by centrifugal force, for example, through a series of closely spaced, relatively small apertures. The extrusion plate might contain 1800 or more closely spaced apertures of a diameter of the order of 0.022 inches, and the extrusion plate or dye itself, in order to resist the abrading effect of movement through these small apertures of the high temperature, semiliquid mineral material, is preferably formed of very hard, heat-resistant, exotic alloy metal. The economical adaptation of electrical discharge machining to the multiple piercing of very small, closely spaced apertures in a workpiece which will become an extrusion plate of the type referred to above has proven to be a considerable problem. To this problem the present invention addresses itself.

SUMMARY OF THE INVENTION

The present invention provides an assembly of multiple, small diameter, rod-type electrodes. Because the electrodes are properly held and positioned, after mounting of the assembly in an electrical discharge machining apparatus, the assembly produces multiple (of the order of 1800) apertures of small diameter (of the order of 0.022 inches ) simultaneously in a workpiece strip of an exotic alloy metal. Since a large quantity of apertures are produced in the workpiece simultaneously, production time required to complete a given number of apertures is substantially reduced.

DESCRIPTION OF THE PREFERRED EMBODIMENT

Figure 1:
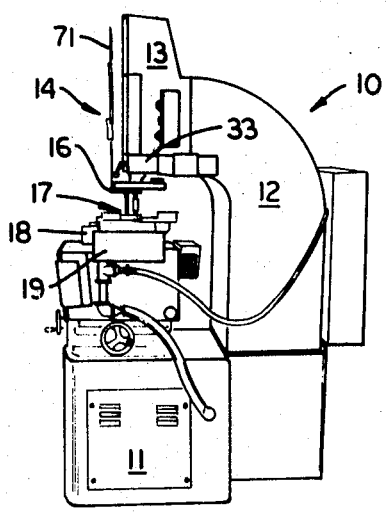
FIG. 1 is a side, perspective view of a conventional electrical discharge machining apparatus with the electrode assembly of the present invention installed on the machine.

Referring to the drawings, an electrical discharge machining apparatus of conventional type is identified generally at 10. The apparatus is characterized by a base portion 11, an upwardly extending portion 12 and a portion 13 which carries a toolhead, indicated generally at 14 in FIG. 1. Removably supported on the toolhead is a fixture 16 which supports the assembly of the present invention, indicated generally at 17 in FIG. 5.

Figure 6:
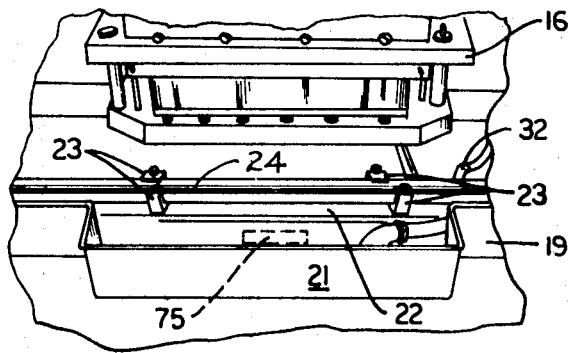
FIG. 6 is a perspective view of the assembly of the present invention mounted in an apparatus as shown in FIG. 1 showing the relation of the assembly of the present invention to the workpiece.

Beneath the assembly carried by the fixture 16 is an elongated pan 18, one end of which 19, is visible in FIG. 1. As may best be seen in FIG. 6 the pan has an enlarged central portion 21 and centrally within the pan, extending a substantial portion of its length, is a workpiece holder 22, having clamps 23 which are adapted to hold rigidly in place a workpiece taking the form of the metal strip 24. The workpiece may extend substantially the length of the pan, however, the portion subject to electrical discharge machining is that portion lying directly under the fixture 16 and the assembly of the present invention 17. The pan is adapted to have circulated through it a dielectric fluid such as an oil, the oil covering the gap across which electric discharge occurs when the fixture and the assembly of the present assembly are lowered from their raised position of FIG. 6 and into machining position adjacent the workpiece 24.

Figure 2:
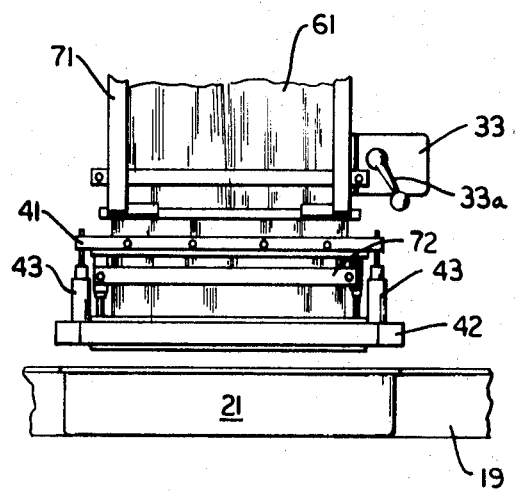
FIG. 2 is an enlarged front view of the assembly of the present invention installed on the machine shown in FIG. 1.
Figure 4:
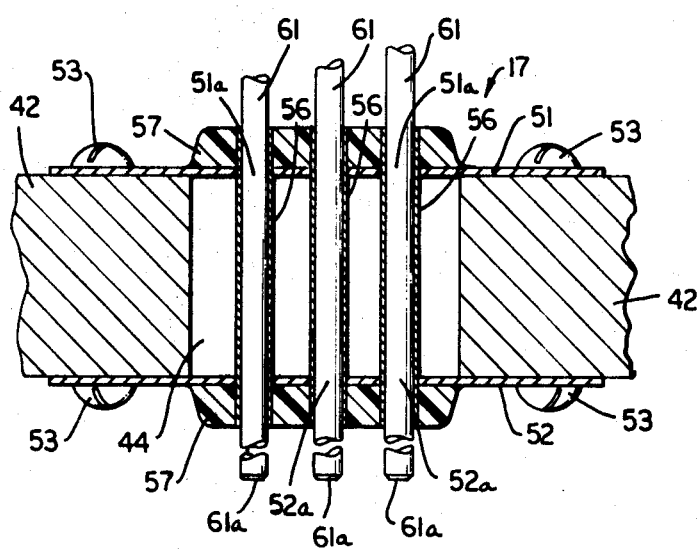
FIG. 4 is an enlarged side sectional view of the assembly of the present invention, shown mounted on a supporting fixture, and taken generally along the line 4—4 of FIG. 3.
Figure 5:
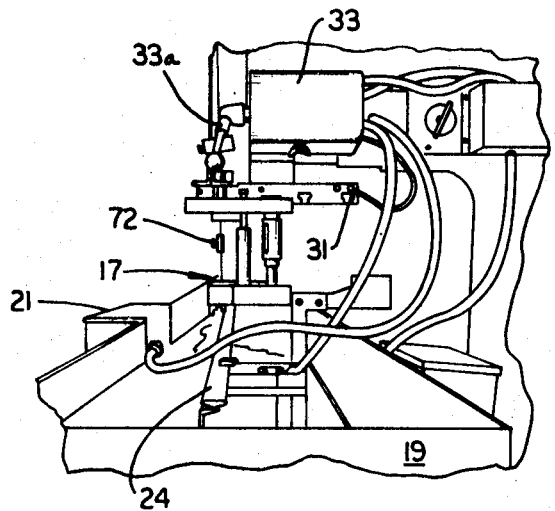
FIG. 5 is a perspective view, taken generally from the side at the right of the apparatus shown in FIG. 1, and illustrating the environment in which the assembly of the present invention is used.

As will be evident from FIG. 5, one electrical output terminal is connected to the fixture at 31 and another is connected at 32 (FIG. 6) to the holder for the workpiece 22. A control switch 33 permits the application of pulsed, direct current potential across the workpiece and the electrodes to be subsequently described which form a part of the assembly of the present invention, the manual operating member 33a also permitting polarity reversal with respect to the electrodes and the workpiece. The structure so far described is of the conventional type in which a hydraulic ram feeds the toolhead downwardly toward the workpiece automatically spacing the electrode element from the workpiece. The structure of the electrode assembly of the present invention will now be described with particular reference to FIGS. 2, 3 and 4. Supporting the structure are fixture elements 41 and 42, separated by spacing structure 43 (FIG. 2). As will be evident from FIGS. 3 and 4, the lowermost of the elements, element 42, is provided with an elongated rectangular slot 44 (FIG. 4) which extends adjacent the front edge of the element 42.

Mounted within the slot 44 is the assembly of the present invention which includes two spaced, parallel plates 51 and 52 which accommodate between them portions of the block 42 and screws 53 serve to fasten the plates to opposite faces of the block 42. The plates 51 and 52 are provided with registering apertures 51a Accommodated and 52a (FIG. 4) which are arranged in a narrow elongated pattern, visible at 54 in FIG. 3. The apertures are quite small, of the order of 0.025 inches, and extending through each pair of registering apertures 51a and 52a is a rigid tube 56 (FIG. 4).

The tubes 56 extend beyond the outer faces of the parallel plates 51 and 52 and the tubes are held in place in the plates by means of a layer of sealing material such as an epoxy resin, as indicated at 57 in FIG. 4, the layer of resin extending to the outer ends of the tubes. Accommodated within the tubes 56 are rod or wire type expendable electrodes 61. The lower ends of the electrodes 61a (FIG. 4) extending into close proximity, with the tool head lowered, to the workpiece 24 and the electric discharge across the tips of the electrodes to the workpiece produces the piercing action required for forming the series of closely spaced apertures in the workpiece.

As will be evident from FIG. 2, the array of electrodes 61 extends upwardly from the element 42, this substantial length of the electrodes permitting repeated piercing operations before a new group of electrode rods need be threaded through the tubes 56. Since the rods extend upwardly in front of the machine a substantial distance, a supporting framework 71 (FIG. 2) may be provided on the fixture end, adjacent the entry of the electrodes into the tubes 56, a transverse clamp member 72 (FIG. 2) may be provided to prevent the electrode rods from bowing over the area extending from the base of the support member 41 and the support member 42.

Figure 3:
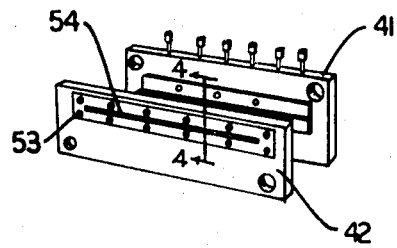
FIG. 3 is a perspective bottom view of the assembly of the present invention.

In operation, with the multiple electrode assembly of the present invention in place in the fixture which includes the support member 42 (as shown in FIGS. 3 and 4), the fixture is clamped on the vertically movable ram portion 13 (FIG. 1) of the electrical discharge machining apparatus 10. A workpiece 24 (FIG. 6) taking the form of a metal strip in which the required, closely spaced apertures are to be formed, is clamped by means of clamps 23 in position vertically below the tips 61a (FIG. 4) of the electrode assembly. Normally, the polarity of the potential applied across the electrodes and the workpiece is such that, during operation, the electrodes are negative and the workpiece is positive, however, initially for a short period of the order of 1 or 2 minutes, polarity is reversed making the electrodes positive as they are moved into proper gap relation with respect to the workpiece by the machine ram. This serves to initially even up the tips of the electrodes since erosion of the electrodes occurs much more rapidly when they are positive. After this initial period, polarity is returned to its normal operating configuration in which the workpiece is positive and the electrodes negative. The electrical discharge machining apparatus automatically maintains the required gap to produce the electrical discharge and the electrodes proceed through the workpiece. When the workpiece has been completely pierced in the pattern of apertures formed by the electrode tips, they engage and actuate an enclosed, sealed switch 75 (FIG. 6) which removes the electrical potential from across the workpiece and the electrodes and causes the machine ram to raise the electrode assembly and its mounting fixture from the finished workpiece. It will be understood that the gap area between the electrode tips and the workpiece is submerged in a circulating dielectric liquid such as oil which is moved through the pan 18.

Since the assembly of the present invention can accommodate electrodes of considerable length, the operation of threading the electrodes through the holding assembly can be minimized for a given work output. The use of rigid tubes held in position by spanning the distance between two parallel, apertured plates provides a means for holding a relatively large number of small-diameter electrode rods or wires.

I claim:

1. In an electrical discharge machining apparatus for piercing a series of closely spaced apertures in an electrically conductive workpiece by causing intermittent electrical discharge across a gap between the workpiece and the electrode, a multiple electrode assembly adapted to be mounted on an electrical discharge machining apparatus in overlying relation to the workpiece, said assembly comprising: two spaced, parallel plates having registering apertures therein, rigid tubes extending through each pair of registering apertures, sealing means securing said tubes in place in said plates, said rigid tubes extending beyond the outer face of said parallel plates and said sealing means comprising an epoxy resin layer placed on the outer faces of the plates at said plate apertures to a thickness substantially equal to the extension of said tubes beyond the outer faces of said parallel plates, and expendable rod electrodes accommodated in and fed through said tubes, said electrodes being adapted to pierce apertures simultaneously in said workpiece conforming to the pattern of registering apertures in said plates.

2. A multiple electrode assembly for electrical discharge machining as claimed in claim 1 in which said plates extend beyond the plate area occupied by said registering apertures, the spaced extending portions of said plates being adapted to accommodate therebetween and to be rigidly fastened to a supporting fixture.